(12) United States Patent
Lim et al.

(10) Patent No.: US 11,575,149 B2
(45) Date of Patent: Feb. 7, 2023

(54) METHOD FOR PREPARING SOLID ELECTROLYTE AND ALL SOLID STATE BATTERY INCLUDING THE SAME

(71) Applicants: Hyundai Motor Company, Seoul (KR); Kia Motors Corporation, Seoul (KR); Korea Institute of Science and Technology, Seoul (KR)

(72) Inventors: Jae Min Lim, Suwon-si (KR); Ju Yeong Seong, Hwaseong-si (KR); Yong Jun Jang, Seongnam-si (KR); Hun Gi Jung, Seoul (KR); Hyoung Chul Kim, Seoul (KR); Eu Deum Jung, Seoul (KR); Bin Na Yoon, Seoul (KR)

(73) Assignees: Hyundai Motor Company, Seoul (KR); Kia Motors Corporation, Seoul (KR); Korea Institute of Science and Technology, Seoul (KR)

( * ) Notice: Subject to any disclaimer, the term of this patent is extended or adjusted under 35 U.S.C. 154(b) by 470 days.

(21) Appl. No.: 15/830,224

(22) Filed: Dec. 4, 2017

(65) Prior Publication Data

US 2018/0323469 A1   Nov. 8, 2018

(30) Foreign Application Priority Data

May 8, 2017   (KR) ........................ 10-2017-0057492

(51) Int. Cl.
| | |
|---|---|
| *H01M 4/04* | (2006.01) |
| *H01M 4/505* | (2010.01) |
| *H01M 10/0562* | (2010.01) |
| *H01M 4/1397* | (2010.01) |
| *H01M 4/136* | (2010.01) |

(Continued)

(52) U.S. Cl.
CPC ....... *H01M 10/0562* (2013.01); *H01M 4/043* (2013.01); *H01M 4/0471* (2013.01); *H01M 4/136* (2013.01); *H01M 4/1397* (2013.01); *H01M 4/364* (2013.01); *H01M 4/505* (2013.01); *H01M 4/525* (2013.01); *H01M 4/625* (2013.01);
(Continued)

(58) Field of Classification Search
CPC .......................... H01M 4/043; H01M 10/0562
See application file for complete search history.

(56) References Cited

U.S. PATENT DOCUMENTS

| | | | | | |
|---|---|---|---|---|---|
| 5,523,179 | A | * | 6/1996 | Chu ........................ | H01M 4/02 136/238 |
| 5,582,623 | A | * | 12/1996 | Chu ........................ | H01M 4/04 29/623.1 |

(Continued)

FOREIGN PATENT DOCUMENTS

| | | |
|---|---|---|
| CN | 102024932 A | 4/2011 |
| CN | 103430364 A | 12/2013 |

(Continued)

*Primary Examiner* — Andrew D Graham
(74) *Attorney, Agent, or Firm* — Morgan, Lewis & Bockius LLP

(57) ABSTRACT

A method for preparing a solid electrolyte for an all-solid state battery, may include obtaining a slurry by dispersing a first raw material comprising lithium sulfide; and a second raw material selected from the group consisting of silicon sulfide, phosphorus sulfide, germanium sulfide, boron sulfide, and a combination thereof in a solvent; and drying the slurry.

10 Claims, 4 Drawing Sheets

(51) Int. Cl.
| | |
|---|---|
| *H01M 4/36* | (2006.01) |
| *H01M 4/525* | (2010.01) |
| *H01M 4/62* | (2006.01) |
| *H01M 10/0525* | (2010.01) |
| *H01M 10/058* | (2010.01) |

(52) U.S. Cl.
CPC ..... *H01M 10/058* (2013.01); *H01M 10/0525* (2013.01); *H01M 2300/0068* (2013.01)

(56) References Cited

U.S. PATENT DOCUMENTS

| | | | | |
|---|---|---|---|---|
| 5,686,201 | A * | 11/1997 | Chu | C07C 227/32 429/104 |
| 5,814,420 | A * | 9/1998 | Chu | C07C 227/32 136/238 |
| 6,432,579 | B1 * | 8/2002 | Tsuji | H01M 4/02 429/218.1 |
| 6,537,701 | B1 * | 3/2003 | Nimon | H01M 4/043 29/623.5 |
| 6,558,843 | B1 * | 5/2003 | Han | C01G 45/1242 423/599 |
| 6,703,166 | B1 * | 3/2004 | Sheem | H01M 4/0404 429/231.4 |
| 7,868,548 | B2 * | 1/2011 | Bae | H01J 9/261 313/582 |
| 8,815,432 | B2 * | 8/2014 | Jo | B32B 5/26 156/167 |
| 9,184,450 | B2 * | 11/2015 | Kim | H01M 12/08 |
| 9,356,315 | B2 * | 5/2016 | Ohtomo | H01M 10/0562 |
| 9,825,328 | B2 * | 11/2017 | Du | H01M 2/1673 |
| 2004/0029014 | A1 * | 2/2004 | Hwang | H01M 4/58 429/246 |
| 2005/0132562 | A1 * | 6/2005 | Saito | H01M 4/0404 29/623.5 |
| 2006/0063071 | A1 * | 3/2006 | Yasuda | H01M 4/0438 429/232 |
| 2007/0292750 | A1 * | 12/2007 | Beard | H01M 2/1653 429/101 |
| 2009/0081554 | A1 * | 3/2009 | Takada | H01M 4/62 429/322 |
| 2009/0325057 | A1 * | 12/2009 | Kim | H01M 4/1391 429/131 |
| 2011/0049745 | A1 * | 3/2011 | Katayama | H01M 10/0585 264/104 |
| 2011/0065007 | A1 * | 3/2011 | Kamiya | H01M 10/0562 429/304 |
| 2011/0076570 | A1 * | 3/2011 | Hama | H01M 10/0565 429/306 |
| 2011/0206974 | A1 * | 8/2011 | Inoue | H01M 4/623 429/149 |
| 2011/0269025 | A1 * | 11/2011 | Sun | H01M 4/131 429/231.5 |
| 2012/0052382 | A1 * | 3/2012 | Yoshida | H01M 4/043 429/211 |
| 2012/0189918 | A1 * | 7/2012 | Tatsumisago | H01M 10/0562 429/322 |
| 2012/0231348 | A1 * | 9/2012 | Ohtomo | H01M 10/0562 429/318 |
| 2013/0040206 | A1 * | 2/2013 | Yoshida | H01M 2/145 429/307 |
| 2013/0164631 | A1 * | 6/2013 | Ohtomo | H01M 10/0562 429/319 |
| 2013/0288134 | A1 * | 10/2013 | Hama | H01B 1/10 429/322 |
| 2013/0302684 | A1 * | 11/2013 | Koshika | H01M 4/136 429/220 |
| 2014/0004257 | A1 * | 1/2014 | Kubo | H01M 10/0562 427/126.1 |
| 2014/0011100 | A1 * | 1/2014 | Lee | H01M 10/0525 429/403 |
| 2014/0038041 | A1 * | 2/2014 | Kajiwara | H01M 4/139 429/211 |
| 2014/0082931 | A1 * | 3/2014 | Nishino | H01M 10/04 29/623.4 |
| 2014/0093785 | A1 * | 4/2014 | Sugiura | H01M 10/0562 429/315 |
| 2014/0120427 | A1 * | 5/2014 | Suyama | H01B 1/10 429/306 |
| 2014/0127575 | A1 * | 5/2014 | Scrosati | H01M 4/5815 429/213 |
| 2014/0127588 | A1 * | 5/2014 | Kato | H01M 4/625 429/304 |
| 2014/0127596 | A1 * | 5/2014 | Sun | H01M 4/96 429/406 |
| 2014/0150961 | A1 * | 6/2014 | Hama | H01M 10/052 156/247 |
| 2014/0162138 | A1 * | 6/2014 | Fujiki | H01M 10/0525 429/322 |
| 2014/0162139 | A1 * | 6/2014 | Hoshiba | H01M 4/133 429/322 |
| 2014/0162140 | A1 * | 6/2014 | Hoshiba | H01M 4/622 429/322 |
| 2014/0178775 | A1 * | 6/2014 | Lee | H01M 12/08 429/405 |
| 2014/0220454 | A1 * | 8/2014 | Furukawa | H01M 4/62 429/319 |
| 2014/0227578 | A1 * | 8/2014 | Yoshida | H01M 2/1673 429/126 |
| 2014/0315103 | A1 | 10/2014 | Higuchi | |
| 2015/0147660 | A1 * | 5/2015 | Fujiki | H01M 4/622 429/306 |
| 2015/0207177 | A1 * | 7/2015 | Ose | H01M 4/133 429/162 |
| 2015/0236373 | A1 * | 8/2015 | Ohtomo | H01M 10/0562 264/104 |
| 2015/0325834 | A1 * | 11/2015 | Kato | H01M 4/043 29/623.1 |
| 2015/0349377 | A1 * | 12/2015 | Sugiura | C03C 3/323 429/306 |
| 2015/0357674 | A1 * | 12/2015 | Haga | H01M 10/0525 429/304 |
| 2016/0028107 | A1 * | 1/2016 | Kubo | H01M 4/62 156/60 |
| 2016/0028108 | A1 * | 1/2016 | Hashimoto | H01M 10/0525 156/60 |
| 2016/0104916 | A1 | 4/2016 | Seino et al. | |
| 2016/0118660 | A1 * | 4/2016 | Nagata | H01M 4/5815 429/218.1 |
| 2016/0204466 | A1 * | 7/2016 | Nogami | H01M 4/587 429/322 |
| 2016/0204467 | A1 * | 7/2016 | Nogami | H01M 10/052 429/322 |
| 2016/0268638 | A1 * | 9/2016 | Jang | H01M 4/622 |
| 2016/0351952 | A1 * | 12/2016 | Ohtomo | H01M 10/0525 |
| 2017/0155127 | A1 * | 6/2017 | Shindo | H01M 10/44 |
| 2017/0179545 | A1 * | 6/2017 | Kodama | H01M 4/525 |
| 2018/0138546 | A1 * | 5/2018 | Sung | H01M 10/052 |
| 2018/0323469 | A1 * | 11/2018 | Lim | H01M 4/505 |

FOREIGN PATENT DOCUMENTS

| | | |
|---|---|---|
| CN | 105765778 A | 7/2016 |
| EP | 3 323 792 A1 | 5/2018 |
| JP | 2011-060649 A | 3/2011 |
| JP | 2016-117640 A | 6/2016 |
| KR | 10-2013-0130820 A | 12/2013 |
| KR | 10-2015-0060517 A | 6/2015 |
| KR | 10-1671219 B1 | 10/2016 |

* cited by examiner (a) (b)

METHOD FOR PREPARING SOLID ELECTROLYTE AND ALL SOLID STATE BATTERY INCLUDING THE SAME

CROSS-REFERENCE TO RELATED APPLICATION

The present application claims priority to Korean Patent Application No. 10-2017-0057492 filed May 8, 2017, the entire contents of which is incorporated herein for all purposes by this reference.

BACKGROUND OF THE INVENTION

Field of the Invention

The present invention relates to a non-milling type method for preparing a solid electrolyte and a method for preparing an all-solid state battery having a densified positive electrode including the solid electrolyte.

Description of Related Art

As a lithium ion secondary battery, an all-solid state battery using a solid electrolyte is known. The all-solid state battery includes an electrolyte layer including a solid electrolyte, electrodes (a positive electrode and a negative electrode) formed on both surfaces of the electrolyte layer and a current collector contacting each electrode. As the solid electrolyte, a sulfide-based solid electrolyte having a high lithium ion conductivity is typically used.

As a positive electrode active material, a transition metal oxide including a lithium ion is used, and since the positive electrode active material has a low lithium ion conductivity, a solid electrolyte is generally included in the positive electrode.

In order to facilitate movement of lithium ions in the positive electrode, the positive electrode active material and the solid electrolyte need to be uniformly distributed, and the positive electrode needs to be formed in a densified form.

In the related art, a positive electrode was manufactured by a simple mechanical mixing process using a positive electrode active material in a powdered form and a solid electrolyte. Accordingly, a plurality of pores is present in the positive electrode, and the positive electrode active material, the solid electrolyte, and the like are non-uniformly distributed, so that there is a problem in that the performance of a battery deteriorates. In particular, characteristics of a material, such as difficulty in achieving micronization due to high ductility of a sulfide-based solid electrolyte, difficulty in selecting a solvent, and vulnerability to moisture act as a fatal limitation in improving existing processes.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method capable of preparing a positive electrode for an all-solid state battery in which a solid electrolyte, a positive electrode active material, and the like are uniformly distributed.

The present invention, in various aspects, has also been made in an effort to solve the above-described problems associated with prior art and provide a method capable of preparing a positive electrode for a densified all-solid state battery by minimizing generation of pores.

The present invention, in various aspects, has also been made in an effort to solve the above-described problems associated with prior art and provide a method capable of preparing a positive electrode for an improved all-solid state battery by simplified processes.

The object of the present invention is not limited to the aforementioned object. The object of the present invention will be more apparent from the following description and will be realized by means described in the claims and by combinations thereof.

Various aspects of the present invention are directed to providing a method for preparing a solid electrolyte for an all-solid state battery, including: obtaining a slurry by dispersing a first raw material including lithium sulfide and a second raw material selected from the group consisting of silicon sulfide, phosphorus sulfide, germanium sulfide, boron sulfide, and a combination thereof in a solvent; and drying the slurry.

In an exemplary embodiment of the present invention, the method does not include milling the first raw material and the second raw material.

In another exemplary embodiment, a third raw material including any one or more of a transition metal element and a halogen element is further dispersed in the solvent.

In yet another exemplary embodiment, the solvent is selected from the group consisting of an ester-based solvent, an ether-based solvent, and a combination thereof.

In yet another exemplary embodiment, the solvent is selected from the group consisting of methyl propionate, ethyl propionate, propyl propionate, and a combination thereof.

In still yet another exemplary embodiment, the drying is carried out under a vacuum or inert gas atmosphere.

In a further exemplary embodiment, the drying is carried out at a temperature of about 100° C. to about 200° C. (e.g., about 100° C. to about 200° C., about 110° C. to about 200° C., about 150° C. to about 200° C., about 180° C. to about 200° C., about 100° C. to about 110° C., about 100° C. to about 120° C., about 100° C. to about 140° C., about 120° C. to about 180° C., or the like).

In another further exemplary embodiment, the solid electrolyte is a sulfide-based solid electrolyte including at least lithium (Li), phosphorus (P), and sulfur (S).

In yet another further exemplary embodiment, the solid electrolyte includes $Li_2S$—$P_2S_5$.

Various aspects of the present invention are directed to providing a method for preparing an all-solid state battery, the method including: adding a positive electrode active material to the slurry obtained by dispersing a first raw material and a second raw material in a solvent and mixing the resulting mixture; obtaining a composite powder including a solid electrolyte and a positive electrode active material by drying the slurry; and forming a positive electrode by hot-pressing the composite powder.

In an exemplary embodiment of the present invention, one selected from the group consisting of a conductive material, a binder, and a combination thereof is further added to the slurry, and the resulting mixture is mixed.

In another exemplary embodiment, the method does not include milling a first raw material, a second raw material, and a positive electrode active material.

In yet another exemplary embodiment, the positive electrode active material is selected from the group consisting of a lithium metal oxide having a layered structure, a lithium metal oxide having a spinel structure, a lithium metal phosphorus oxide having an olivine structure, and a combination thereof.

In yet another exemplary embodiment, the solvent is selected from the group consisting of methyl propionate, ethyl propionate, propyl propionate, and a combination thereof.

In still yet another exemplary embodiment, the drying is carried out at a temperature of about 100° C. to about 200° C. (e.g., about 100° C. to about 200° C., about 110° C. to about 200° C., about 150° C. to about 200° C., about 180° C. to about 200° C., about 100° C. to about 110° C., about 100° C. to about 120° C., about 100° C. to about 140° C., about 120° C. to about 180° C., or the like) under a vacuum or inert gas atmosphere.

In a further exemplary embodiment, a positive electrode active material, a solid electrolyte, and a conductive material are included at a mass ratio of 65 to 80:10 to 25:10 to 20 in the composite powder. In other words, the mass ratio can be 65-80:10-25:10-20 (positive electrode active material:solid electrolyte:conductive material). In some cases, the mass ratio in the composite powder is 65:10:10, 65:10:20, 65:25:10, 65:25:20, 80:25:20, 85:10:10, 85:10:20, 85:25:10, and the like. In various exemplary embodiments, the mass ratio is 65:25:10. In other exemplary embodiments, the mass ratio is 80:10:10

In another further exemplary embodiment, the hot-pressing is carried out at a temperature of about 100° C. to about 200° C. (e.g., about 100° C. to about 200° C., about 110° C. to about 200° C., about 150° C. to about 200° C., about 180° C. to about 200° C., about 100° C. to about 110° C., about 100° C. to about 120° C., about 100° C. to about 140° C., about 120° C. to about 180° C., or the like) for about 5 minutes to about 60 minutes (e.g., about 5 minutes, about 10 minutes, about 15 minutes, about 20 minutes, about 25 minutes, about 30 minutes, about 35 minutes, about 40 minutes, about 45 minutes, about 50 minutes, about 55 minutes, or about 60 minutes).

In yet another further exemplary embodiment, the hot-pressing is carried out under a pressure of about 1 ton to about 10 tons (e.g., about 1 ton, about 2 tons, about 3 tons, about 4 tons, about 5 tons, about 6 tons, about 7 tons, about 8 tons, about 9 tons, or about 10 tons).

In yet another further exemplary embodiment, a positive electrode-electrolyte layer composite is formed by applying the composite powder in a mold, and applying an electrolyte powder onto the composite powder, and then hot-pressing the composite powder and the electrolyte powder.

In still yet another further exemplary embodiment, the electrolyte powder is selected from the group consisting of an oxide-based solid electrolyte powder, a sulfide-based solid electrolyte powder, and a combination thereof.

According to an exemplary embodiment of the present invention, in preparing a solid electrolyte, it is possible to prevent the solid electrolyte from deteriorating because a sulfide being a raw material is not exposed to moisture and air.

According to an exemplary embodiment of the present invention, it is possible to overcome a limitation of a material, in which it is difficult to achieve micronization because it is possible to form a solid electrolyte or a positive electrode for an all-solid state battery, including the same without carrying out the milling step on a soft sulfide.

According to an exemplary embodiment of the present invention, it is possible to improve the performance such as a capacity of an all-solid state battery because a solid electrolyte and a positive electrode active material are uniformly distributed in a positive electrode and a densified positive electrode may be formed.

According to an exemplary embodiment of the present invention, productivity, price competitiveness, and the like may be improved because an all-solid state battery with improved performance may be prepared without being subjected to various composite steps.

The effects of the present invention are not limited to the aforementioned effects. The effects of the present invention are to be understood to include all the effects capable of being inferred from the following explanation.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
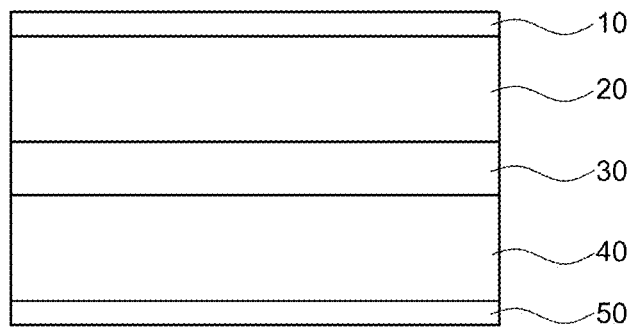
FIG. 1 schematically illustrates an all-solid state battery prepared according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, the present invention will be described in detail through Examples. The Examples of the present invention may be modified in various forms as long as the gist of the invention is not changed. However, the right scope of the present invention is not limited to the following Examples.

If it is judged that publicly known configurations and functions may obscure the gist of the present invention, the description on the publicly known configurations and functions will be omitted. The term "including" in the present specification means further including other constituent elements unless otherwise specifically described.

Various exemplary embodiments of the present invention is as follows.

Various aspects of the present invention are directed to providing a method for preparing a solid electrolyte for an all-solid state battery, including obtaining a slurry by dispersing a first raw material including lithium sulfide; and a second raw material selected from the group consisting of silicon sulfide, phosphorus sulfide, germanium sulfide, boron sulfide, and a combination thereof in a solvent and drying the slurry.

In the related art, a solid electrolyte was prepared by a dry process including mechanically grinding a raw material such as lithium sulfide and phosphorus sulfide by milling. The method in the related art as described above adopts a milling technique in which a lot of heat is generated even though a sulfide-based compound being a raw material has high ductility, and thus has a problem in that the raw material is not uniformly mixed, a problem in that atomization is not properly achieved, and the like. Furthermore, the method also has a problem in that during the milling process, the raw material being a sulfide-based compound is exposed to air and moisture, and thus deteriorates.

Thus, the present invention has a technical feature in that a solid electrolyte is prepared by a wet process of dispersing a first raw material, a second raw material, and the like in a solvent, mixing the resulting mixture, and then drying the mixture, and the above-described problems are solved by using a specific solvent.

The first raw material may include lithium sulfide, and the second raw material may include a sulfide selected from the group consisting of silicon sulfide, phosphorous sulfide, germanium sulfide, boron sulfide, and a combination thereof. Furthermore, it is possible to further disperse a third raw material being a compound including any one or more of a transition metal element and a halogen element in the solvent.

The solid electrolyte may be a sulfide-based solid electrolyte including at least lithium (Li), phosphorus (P), and sulfur (S), and specifically may be $Li_2S-P_2S_5$. However, the solid electrolyte is not limited thereto, and may further include a sulfide such as $SiS_2$, $GeS_2$ and $B_2S_5$ in addition to $Li_2S-P_2S_5$. In addition, the solid electrolyte may further include a halogen compound and a transition metal compound in addition to the sulfide-based solid electrolyte.

The mixing ratio of $Li_2S-P_2S_5$ may be 50:50 to 80:20 by mole, specifically 60:40 to 75:25 by mole, and preferably, the mixture may be mixed at a molar ratio of 75:25.

The solvent may be a solvent which includes an alkoxy group, does not include a strongly polar substituent such as a hydroxy group and an amine group, and is selected from the group consisting of an ester-based solvent having a linear structure having no ring, an ether-based solvent, or a combination thereof, may be preferably an ester-based solvent satisfying the aforementioned characteristics, and may be specifically a solvent selected from the group consisting of methyl propionate, ethyl propionate, propyl propionate, and a combination thereof.

Since the sulfide-based compound such as the first raw material and the second raw material has significant reactivity, there is a concern in that when a polar solvent such as water and ethanol is used, the sulfide-based compound may be reacted with the polar solvent.

In contrast, the solvent includes an oxygen atom having an unshared electron pair, and thus shows partial polarity, but the aforementioned problem does not occur because the solvent is not a polar solvent such as water and ethanol. Rather, the first raw material and the second raw material are appropriately guided by partial polarity of the solvent, and thus may be uniformly dispersed in the solvent.

The solid electrolyte may be prepared by drying a slurry obtained by dispersing the first raw material and the second raw material in the solvent.

The drying may be carried out under a vacuum or inert gas atmosphere. Accordingly, it is possible to prevent the solid electrolyte from deteriorating by being exposed to moisture and air.

The drying may be carried out at a temperature of about 100° C. to about 200° C. (e.g., about 100° C. to about 200° C., about 110° C. to about 200° C., about 150° C. to about 200° C., about 180° C. to about 200° C., about 100° C. to about 110° C., about 100° C. to about 120° C., about 100° C. to about 140° C., about 120° C. to about 180° C., or the like) for about 2 hours to about 24 hours (e.g., about 2 hours, about 5 hours, about 6 hours, about 7 hours, about 8 hours, about 10 hours, about 12 hours, about 15 hours, about 16 hours, about 17 hours, about 18 hours, or about 20 hours). There is a concern in that when the drying temperature is less than 100° C. and the drying time is less than 2 hours, the slurry may not be sufficiently dried, and when the drying temperature is more than 200° C. and the drying time is more than 24 hours, the solid electrolyte may deteriorate.

Various exemplary embodiments of the present invention is as follows.

Various aspects of the present invention are directed to providing a method for preparing an all-solid state battery, the method including: obtaining a slurry by dispersing a first raw material including lithium sulfide and a second raw material selected from the group consisting of silicon sulfide, phosphorus sulfide, germanium sulfide, boron sulfide, and a combination thereof in a solvent; adding a positive electrode active material to the slurry and mixing the resulting mixture; obtaining a composite powder including a solid electrolyte and a positive electrode active material by drying the slurry; and forming a positive electrode by hot-pressing the composite powder.

The present invention has a technical feature in that a slurry is obtained by dispersing the first raw material and the second raw material in a solvent, and then a composite powder in which a solid electrolyte and a positive electrode active material are uniformly dispersed by continuously or non-continuously adding the positive electrode active material in the slurry and mixing and drying the resulting mixture is obtained.

In the related art, a powder of a solid electrolyte is first prepared, and a positive electrode laminated material is obtained by mixing the powder of the solid electrolyte and the positive electrode active material. In contrast, the present invention may obtain an effect of improving productivity accompanied by simplification of processes because a positive electrode active material is mixed and dried along with a first raw material and a second raw material by a one-pot process. Furthermore, since the positive electrode active material is added and mixed during the process of preparing the solid electrolyte from the first raw material and the second raw material, the solid electrolyte and the positive electrode active material may be uniformly dispersed as compared to the method in the related art.

Since the present invention does not include mechanically grinding a first raw material, a second raw material, and a positive electrode active material by milling, there does not occur a problem accompanied by material characteristics of the first raw material and the second raw material, which are a sulfide-based compound.

The first raw material may include lithium sulfide, and the second raw material may include a sulfide selected from the group consisting of silicon sulfide, phosphorous sulfide, germanium sulfide, boron sulfide, and a combination thereof. Furthermore, it is possible to further disperse a third raw material being a compound including any one or more of a transition metal element and a halogen element in the solvent.

The positive electrode active material is not particularly limited as long as the material can reversibly occlude and release lithium ions, and may be, for example, a positive electrode active material selected from the group consisting of a lithium metal oxide having a layered structure, a lithium metal oxide having a spinel structure, a lithium metal phosphorus oxide having an olivine structure, and a combination thereof.

The lithium metal oxide having a layered structure means a lithium metal oxide having a thin sheet shape, and may be lithium nickel cobalt aluminate ($LiNi_xCo_yAl_{1-x-y}O_2$, NCA), lithium nickel cobalt manganese oxide ($LiNi_xCo_yMn_{1-x-y}O_2$, NCM), lithium cobalt oxide ($LiCoO_2$, LCO), and the like.

The lithium metal oxide having a spinel structure forms a cubic crystal structure. Due to a 3D crystal structure, the lithium metal oxide is very stable because the migration route of lithium ions is short, the ion conductivity is high, and the overall structure does not collapse during the deintercalation of lithium ions. The lithium metal oxide having a spinel structure may have a composition of $LiM_2O_4$ (M=Ti, V, Mn, or Ni).

Since the lithium metal phosphorus oxide having an olivine structure has a very stable structure, the capacity is rarely decreased, and the chemical stability is also high. For example, the lithium metal phosphorus oxide having an olivine structure may be $LiFePO_4$, $LiMnPO_4$, $LiFe_xM_{n(1-x)}PO_4$ (0<x<1), and the like.

It is possible to further add an additive selected from the group consisting of a conductive material, a binder, and a combination thereof along with the positive electrode active material to the slurry, and mix the resulting mixture.

The conductive material is not particularly limited as long as the conductive material increases the conductivity of a positive electrode, and may be, for example, a carbon black such as Ketjen black or acetylene black, graphite, natural graphite, artificial graphite, and the like.

The binder is not particularly limited as long as the binder is for improving adhesive strength between constituent components such as a solid electrolyte, a positive electrode active material, and a conductive material, and may be, for example, polyvinylidene fluoride, polypropylene, an ethylene-propylene-diene polymer, and the like.

The solvent may be a solvent which includes an alkoxy group, does not include a strongly polar substituent such as a hydroxy group and an amine group, and is selected from the group consisting of an ester-based solvent having a linear structure having no ring, an ether-based solvent, or a combination thereof, may be preferably an ester-based solvent satisfying the aforementioned characteristics, and may be specifically a solvent selected from the group consisting of methyl propionate, ethyl propionate, propyl propionate, and a combination thereof.

The solvent includes an oxygen atom having an unshared electron pair, and thus shows partial polarity, but since the solvent is not a polar solvent such as water and ethanol, there is no concern in that the solvent is reacted with a first raw material, a second raw material, a positive electrode active material, and the like. Furthermore, the first raw material, the second raw material, and the positive electrode active material are appropriately guided by a partial polarity of the solvent, and thus may be uniformly dispersed in the solvent, and accordingly, it is possible to obtain a composite powder in which the solid electrolyte and the positive electrode active material are uniformly mixed.

The composite powder may be prepared by drying a slurry obtained by dispersing the first raw material, the second raw material, and the positive electrode active material in the solvent.

The drying may be carried out under a vacuum or inert gas atmosphere. Accordingly, it is possible to prevent the solid electrolyte from deteriorating by being exposed to moisture and air.

The drying may be carried out at a temperature of 100° C. to 200° C. for 2 hours to 24 hours. There is a concern in that when the drying temperature is less than 100° C. and the drying time is less than 2 hours, the slurry may not be sufficiently dried, and when the drying temperature is more than 200° C. and the drying time is more than 24 hours, the solid electrolyte may deteriorate.

The contents of the positive electrode active material, the solid electrolyte, and the conductive material included in the composite powder are not particularly limited. For example, the positive electrode active material, the solid electrolyte, and the conductive material may be included at a mass ratio of 65 to 80:10 to 25:10 to 20. The contents of the positive electrode active material, the solid electrolyte, and the conductive material may be adjusted by amounts of positive electrode active material, first raw material, second raw material, conductive material, and the like introduced into the solvent.

The present invention has a technical feature in that as described above, a composite powder in which a solid electrolyte, a positive electrode active material, and the like are uniformly mixed by a wet process using a specific solvent is obtained, and a positive electrode is formed by hot-pressing the composite powder under specific conditions. As a result, a densified positive electrode may be obtained in a state in which a solid electrolyte and a positive electrode active material are uniformly distributed, and accordingly, the performance such as capacity of an all-solid state battery may be significantly improved.

Since the present invention densities the composite powder by hot-pressing the composite powder, it is possible to easily increase the amount of positive electrode active material loaded (content of the positive electrode active material in the composite powder.

The hot-pressing may be carried out at a temperature of about 100° C. to about 200° C. (e.g., about 100° C. to about 200° C., about 110° C. to about 200° C., about 150° C. to about 200° C., about 180° C. to about 200° C., about 100° C. to about 110° C., about 100° C. to about 120° C., about 100° C. to about 140° C., about 120° C. to about 180° C., or the like) for 5 minutes to 60 minutes (e.g., about 5 minutes, about 10 minutes, about 15 minutes, about 20 minutes, about 25 minutes, about 30 minutes, about 35 minutes, about 40 minutes, about 45 minutes, about 50 minutes, about 55 minutes, or about 60 minutes). When the temperature is less than 100° C. or the compression time is less than 5 minutes, the positive electrode may not be densified, and when the temperature is more than 200° C. or the compression time is more than 60 minutes, the solid electrolyte, the positive electrode active material, and the like may be damaged.

The hot-pressing may be carried out under a pressure of 1 ton to 10 tons. When the pressure is less than 1 ton, the positive electrode may not be densified, and when the pressure is more than 10 tons, the solid electrolyte, the positive electrode active material, and the like may be damaged.

Various exemplary embodiments of the present invention is as follows.

Various aspects of the present invention are directed to providing a method for preparing an all-solid state battery, the method including: obtaining a slurry by dispersing a first raw material including lithium sulfide and a second raw material selected from the group consisting of silicon sulfide, phosphorus sulfide, germanium sulfide, boron sulfide, and a combination thereof in a solvent; adding a positive electrode active material to the slurry and mixing the resulting mixture; obtaining a composite powder including a solid electrolyte and a positive electrode active material by drying the slurry; and forming a positive electrode-electrolyte layer composite by applying an electrolyte powder onto the composite powder, and then hot-pressing the composite powder and the electrolyte powder.

Specifically, the method is characterized in that instead of preparing a positive electrode by hot-pressing the composite powder alone, a positive electrode-electrolyte layer is prepared through a single step by applying the composite powder in a mold, applying an electrolyte powder onto the composite powder, and then hot-pressing both the composite powder and the electrolyte powder.

The electrolyte powder may be selected from the group consisting of an oxide-based solid electrolyte powder, a sulfide-based solid electrolyte powder, and a combination thereof. When the electrolyte powder is a sulfide-based solid electrolyte powder, the sulfide-based solid electrolyte powder may be the solid electrolyte in the various exemplary embodiments.

FIG. 1 is a view schematically illustrating an all-solid state battery prepared according to an exemplary embodiment of the present invention. An all-solid state battery 1 prepared according to an exemplary embodiment of the present invention may include a positive electrode current collector 10, a positive electrode 20, an electrolyte layer 30, a negative electrode 40, and a negative electrode current collector 50.

The various exemplary embodiments forms the positive electrode 20 and the electrolyte layer 30 in a form of a positive electrode-electrolyte layer composite. However, since the positive electrode-electrolyte layer composite is named for the convenience of explanation according to the preparation method, and is not a particularly specified constitution, the positive electrode 20 and the electrolyte layer 30 will be described below as separate constitutions.

Any current collector may be used without limitation as long as the positive electrode current collector 10 is a conductor. For example, aluminum, stainless steel, nickel-plated steel, and the like may be used.

The positive electrode 20 may include a positive electrode active material, a solid electrolyte, and a conductive material, and additionally may further include a binder.

The electrolyte layer 30 may be formed of an electrolyte powder selected from the group consisting of an oxide-based solid electrolyte powder, a sulfide-based solid electrolyte powder, and a combination thereof.

The negative electrode 40 may include a negative electrode active material capable of intercalating and deintercalating lithium. The negative electrode active material may be, for example, a lithium metal; a transition metal oxide such as $Li_{4/3}Ti_{5/3}O_4$; a carbon material such as artificial graphite, graphite carbon fiber, cokes, and natural graphite; and the like.

Any current collector may be used as the negative electrode current collector 50 without limitation as long as the current collector is a conductor. For example, aluminum, stainless steel, nickel-plated steel, and the like may be used.

When the various exemplary embodiments is followed, the solid electrolyte is obtained in a form of a powder. Accordingly, an application solution may be prepared by mixing the solid electrolyte with a positive electrode active material, a conductive material, and the like, and the positive electrode may be prepared by applying the application solution onto the positive electrode current collector, and then drying the application solution. However, the method is not limited thereto, and any method may be adopted as long as the method is a method capable of preparing a positive electrode by using a solid electrolyte in a form of a powder.

When the various exemplary embodiments is followed, the densified positive electrode 20 may be stacked on the positive electrode current collector 10. At this time, an adhesive strength between the positive electrode 20 and the positive electrode current collector 10 may be insufficient, so that it is possible to further form a separate adhesive layer (not illustrated) therebetween. The adhesive layer may be formed of a resin composition such as a styrene butadiene block copolymer, a butadiene rubber, and an isoprene rubber.

When the various exemplary embodiments is followed, a positive electrode 20 and an electrolyte layer 30 are formed in a form of a positive electrode-electrolyte layer composite, so that an all-solid state battery may be prepared by a method of stacking the positive electrode-electrolyte layer composite on the positive electrode current collector 10.

Hereinafter, the present invention will be described in more detail through the specific Examples. However, the Examples are provided for exemplifying the present invention, and the scope of the present invention is not limited thereby.

EXAMPLES

The following examples illustrate the invention and are not intended to limit the same.

Example 1

As a first raw material and a second raw material, $Li_2S$ and $P_2S_5$ were used, respectively. The first raw material and the second raw material were weighed at a molar ratio of 75:25, and then were dispersed in an ethyl propionate solvent including no moisture. At this time, the first raw material and the second raw material were added to 100 ml of the solvent so as to have a concentration of 100 mg. A slurry was obtained by stirring the mixture with a magnetic bar for about 12 hours.

$LiNi_{0.6}Co_{0.2}Mn_{0.2}O_2$ (NCM622) as a positive electrode active material was added to the slurry, and as a conductive material, super P carbon black was added thereto. At this time, the positive electrode active material and the conductive material were weighed and added thereto so as for the mass ratio of the positive electrode active material, the solid electrolyte, and the conductive material to be 65:25:10.

Each component was uniformly mixed by stirring the slurry with a magnetic bar for about 2 hours.

The slurry was dried at a temperature of about 170° C. under a vacuum atmosphere for about 4 hours to obtain a composite power including a positive electrode active material, a sulfide-based solid electrolyte having $Li_3PS_4$ crystallinity, and a conductive material.

75 mg of the composite powder was applied onto a mold having a diameter of 14 mm, 150 mg of a sulfide-based solid electrolyte ($Li_2S$—$P_2S_5$) powder was applied onto the composite powder, and then the composite powder was hot-pressed to form a positive electrode-electrolyte layer composite. The hot-pressing was carried out at a temperature of about 150° C. for a compression time of about 30 minutes under a pressure condition of about 8 tons.

In the positive electrode-electrolyte layer composite, an indium foil was attached to a surface opposite to the positive electrode, and then subjected to compression molding at room temperature to prepare a half cell of an all-solid state battery.

Example 2

A half cell of an all-solid state battery was prepared in the same material and method as in Example 1, except that when compared with Example 1, the positive electrode active material and the conductive material were weighed and added thereto so as for the mass ratio of the positive electrode active material, the solid electrolyte, and the conductive material to be 80:10:10.

Comparative Example 1

As a first raw material and a second raw material, $Li_2S$ and $P_2S_5$ were used, respectively. The first raw material and the second raw material were weighed at a molar ratio of 75:25, and the mixture was milled at a rate of 650 rpm for about 6 hours by using a planetary mill to obtain a vitreous powder. The vitreous powder was subjected to heat treatment at about 250° C. under an argon atmosphere for about 2 hours to obtain a sulfide-based solid electrolyte having $Li_3PS_4$ crystallinity.

As a positive electrode active material, $LiNi_{0.6}Co_{0.2}Mn_{0.2}O_2$ (NCM622) was used, and as a conductive material, Denka black carbon black was used. The positive electrode active material, the solid electrolyte, and the conductive material were weighed so as for the mass ratio of the positive electrode active material, the solid electrolyte, and the conductive material to be 65:25:10, and were mixed for about 30 minutes by using a vortex mixer to obtain a composite powder including a positive electrode active material, a sulfide-based solid electrolyte having $Li_3PS_4$ crystallinity, and a conductive material.

75 mg of the composite powder was applied onto a mold having a diameter of 14 mm, 150 mg of a sulfide-based solid electrolyte ($Li_2S$—$P_2S_5$) powder was applied onto the composite powder, and then the composite powder was compressed at room temperature under a pressure of about 8 tons for about 30 minutes to form a positive electrode-electrolyte layer composite.

In the positive electrode-electrolyte layer composite, an indium foil was attached to a surface opposite to the positive electrode, and then subjected to compression molding at room temperature to prepare a half cell of an all-solid state battery.

Comparative Example 2

A half cell of an all-solid state battery was prepared in the same material and method as in Comparative Example 1, except that when compared with Comparative Example 1, the composite powder and the sulfide-based solid electrolyte powder were hot-pressed at a temperature of about 150° C. for a compression time of about 30 minutes under a pressure condition of about 8 tons in forming the positive electrode-electrolyte layer composite.

TEST EXAMPLES

Test Example 1

Figure 2:
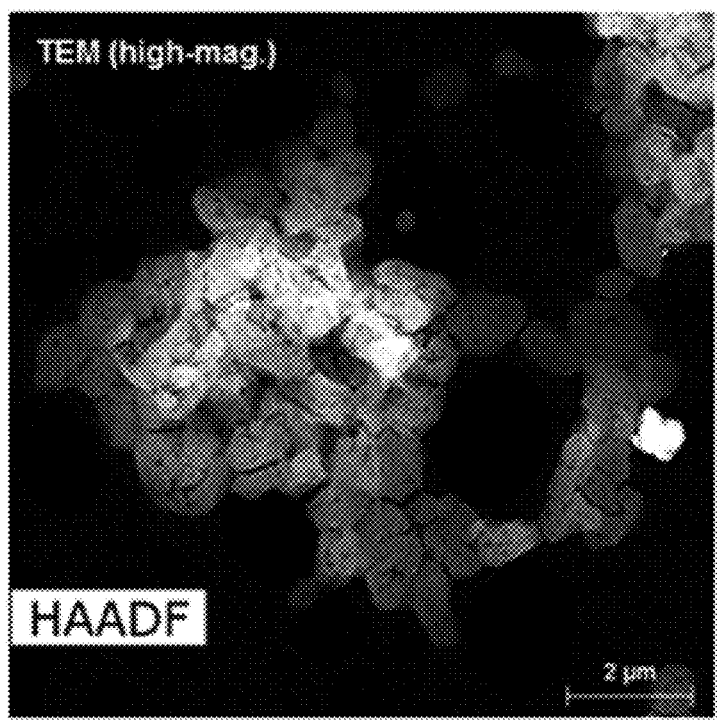
FIG. 2 is a result of analyzing a solid electrolyte in a positive electrode included in the all-solid state battery in Example 1 of the present invention by a transmission electron microscope (TEM)
Figure 2:
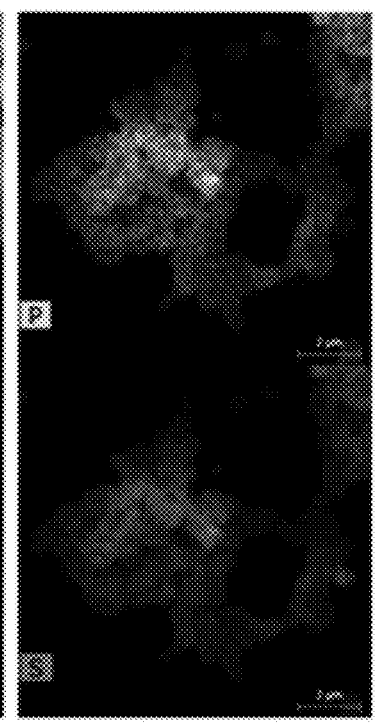

The solid electrolyte in the positive electrode included in the all-solid state battery in Example 1 was analyzed by a transmission electron microscope (TEM). The results are shown in FIG. 2.

Referring to FIG. 2A, it can be seen that primary particles micronized to a diameter of about 0.7 μm were uniformly formed. Furthermore, referring to FIG. 2B, it can be seen that phosphorus (P) and sulfur (S) components were uniformly distributed in the solid electrolyte.

Test Example 2

The surfaces and cross-sections of the positive electrodes included in the all solid batteries in Example 1, Example 2, Comparative Example 1, and Comparative Example 2 were analyzed by using a scanning electron microscope (SEM) and focused ion beam (FIB). The results are shown in FIGS. 3 to 6.

Figure 3:
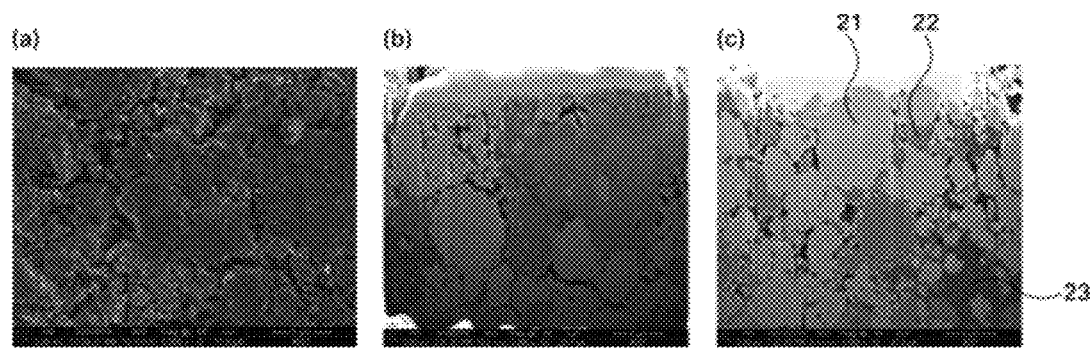
FIG. 3 is a result of analyzing the surface and cross-section of a positive electrode included in the all-solid state battery in Comparative Example 1 of the present invention by using a scanning electron microscope (SEM) and focused ion beam (FIB)

FIG. 3 is a captured photograph of a surface (a) and a cross section (b and c) of the positive electrode in Comparative Example 1. In Comparative Example 1, a positive electrode was prepared by preparing a solid electrolyte by a dry milling process, mixing the solid electrolyte, the positive electrode active material, and the conductive material by a vortex mixer to obtain a composite powder, and then compressing the composite powder at room temperature.

Referring to FIG. 3A, it can be seen that cracks and pores caused by the cracks were formed in considerably large amounts in the positive electrode. Furthermore, referring to FIGS. 3B and 3C, it can be seen that the positive electrode active material 21, the solid electrolyte 22, and the conductive material 23 were significantly non-uniformly dispersed.

Figure 4:
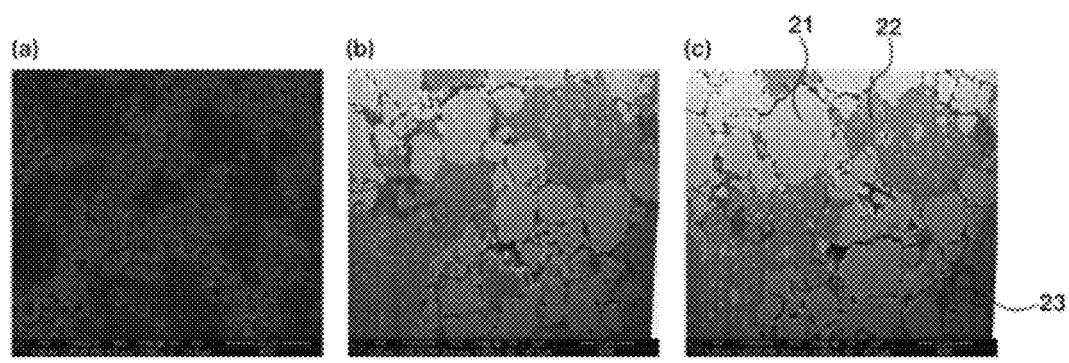
FIG. 4 is a result of analyzing the surface and cross-section of a positive electrode included in the all-solid state battery in Comparative Example 2 of the present invention by using a scanning electron microscope (SEM) and focused ion beam (FIB)

FIG. 4 is a captured photograph of a surface (a) and a cross section (b and c) of the positive electrode in Comparative Example 2. In Comparative Example 2, a positive electrode was prepared by preparing a solid electrolyte by a dry milling process, mixing the solid electrolyte, the positive electrode active material, and the conductive material by a vortex mixer to obtain a composite powder, and then hot-pressing the composite powder.

Referring to FIG. 4A, it can be seen that a positive electrode was prepared by hot-pressing, and the cracks on the surface were significantly reduced as compared to Comparative Example 1. Furthermore, referring to FIGS. 4B and 4C, it can be seen that the positive electrode active material 21, the solid electrolyte 22, and the conductive material 23 were significantly non-uniformly dispersed.

Figure 5:
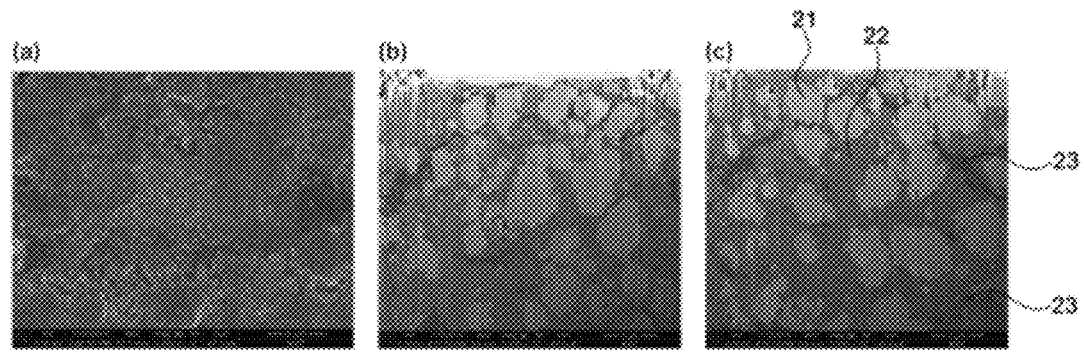
FIG. 5 is a result of analyzing the surface and cross-section of a positive electrode included in the all-solid state battery in Example 1 of the present invention by using a scanning electron microscope (SEM) and focused ion beam (FIB)

FIG. 5 is a captured photograph of a surface (a) and a cross section (b and c) of the positive electrode in Example 1. In Example 1, a positive electrode was prepared by preparing a solid electrolyte by a wet non-milling process in which an ethyl propionate solvent was used, adding a positive electrode active material and a conductive material to the solvent to obtain a composite powder, and then hot-pressing the composite powder.

Referring to FIG. 5A, it can be seen that cracks were little found on the surface. Furthermore, referring to FIGS. 5B and 5C, it can be confirmed that the positive electrode active material 21, the solid electrolyte 22, and the conductive material 23 were uniformly dispersed, and it can be seen that particularly, the interfacial contact properties between the positive electrode active material 21 and the solid electrolyte 22 were improved.

Figure 6:
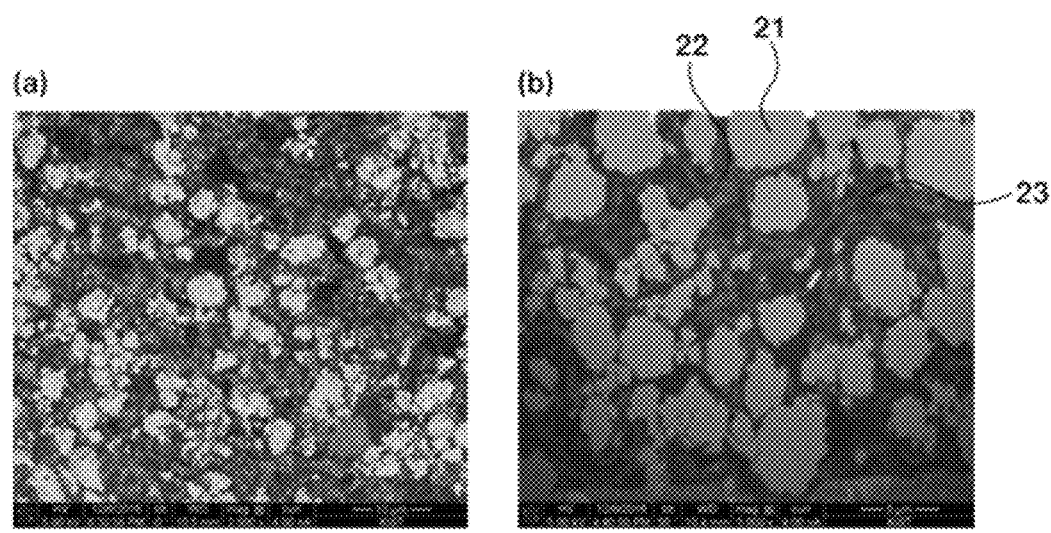
FIG. 6 is a result of analyzing the surface and cross-section of a positive electrode included in the all-solid state battery in Example 2 of the present invention by using a scanning electron microscope (SEM) and focused ion beam (FIB)

FIG. 6 is a captured photograph of a surface (a) and a cross section (b and c) of the positive electrode in Example 2. In Example 2, a positive electrode was prepared in the same manner as in Example 1, and the amount of positive electrode active material loaded (content) is increased.

Referring to FIG. 6A, it can be confirmed that a large size of the positive electrode active material was formed, and cracks were also little found. Furthermore, referring to FIG. 6B, it can be confirmed that the positive electrode active material 21, the solid electrolyte 22, and the conductive material 23 were uniformly dispersed, and that the interfacial contact properties between the positive electrode active material 21 and the solid electrolyte 22 were improved.

Test Example 3

Charge and discharge characteristics of the all solid batteries in Example 1 and Comparative Example 1 were evaluated. The charge and discharge voltage and capacity were measured by applying a current density of 0.3 C-rate to the all-solid state battery. The results are shown in FIGS. 7 and 8.

Figure 7:
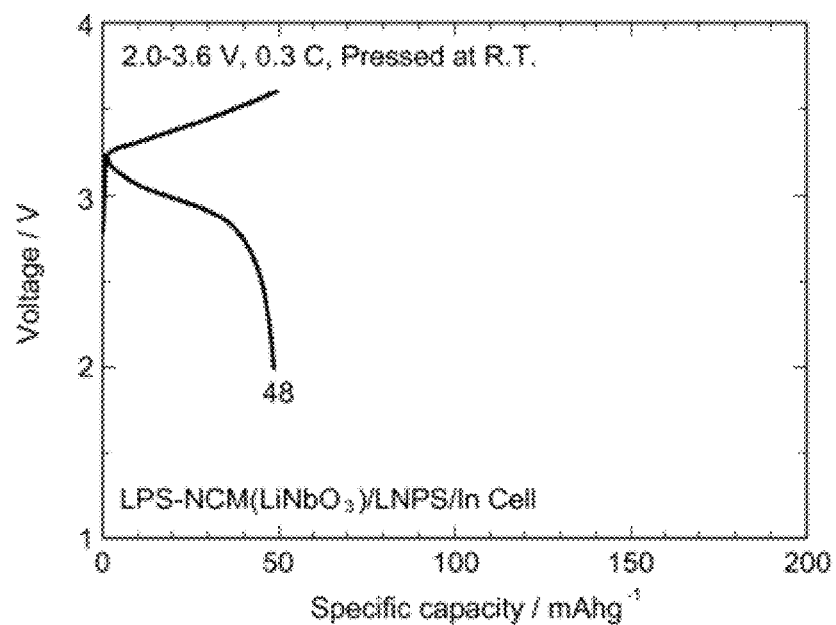
FIG. 7 is a result of measuring charge and discharge characteristics of the all-solid state battery in Comparative Example 1 of the present invention.

FIG. 7 is a result in Comparative Example 1. Referring to FIG. 7, it can be seen that the all-solid state battery according to Comparative Example 1 had a discharge capacity of about 48 mAh/g under a 0.3 C-rate condition.

Figure 8:
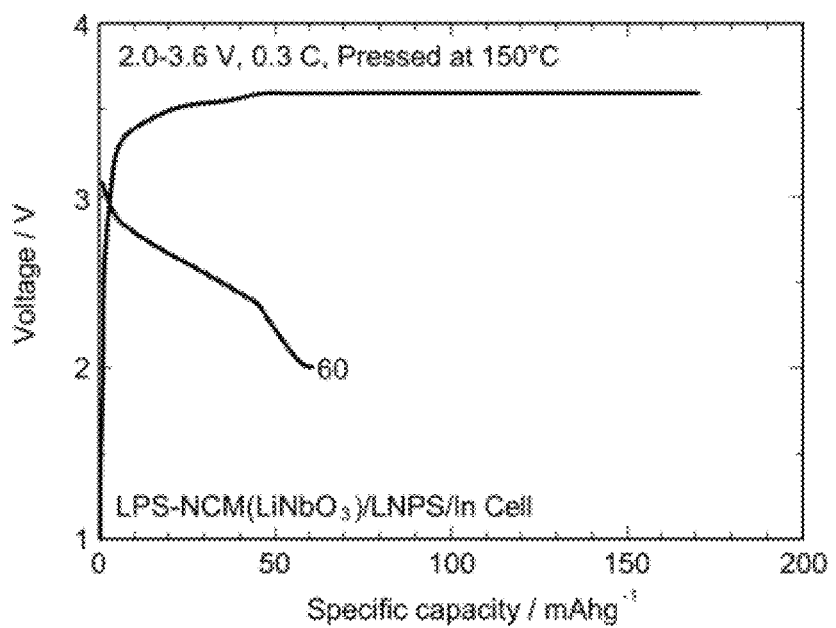
FIG. 8 is a result of measuring charge and discharge characteristics of the all-solid state battery in Example 1 of the present invention.

FIG. 8 is a result in Example 1. Referring to FIG. 8, it can be seen that the all-solid state battery according to Example 1 had a discharge capacity of about 60 mAh/g under a 0.3 C-rate condition.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for preparing a positive electrode for an all-solid state battery, the method comprising:
    obtaining a slurry by dispersing a first raw material including lithium sulfide and a second raw material selected from the group consisting of silicon sulfide, phosphorus sulfide, germanium sulfide, boron sulfide, and a combination thereof in a solvent selected from the group consisting of methyl propionate, ethyl propionate, propyl propionate, and a combination thereof;
    adding a positive electrode active material to the slurry and mixing the resulting mixture;
    obtaining a composite powder comprising a solid electrolyte and a positive electrode active material by drying the slurry;
    forming the positive electrode by hot-pressing the composite powder, and
    wherein the positive electrode active material is mixed and dried along with the first raw material and the second raw material by a one-pot process.

2. The method of claim 1, wherein one selected from the group consisting of a conductive material, a binder, and a combination thereof is further added to the slurry and the mixture is mixed.

3. The method of claim 1, wherein the method does not comprise milling the first raw material, the second raw material, and the positive electrode active material.

4. The method of claim 1, wherein the positive electrode active material is selected from the group consisting of a lithium metal oxide having a layered structure, a lithium metal oxide having a spinel structure, a lithium metal phosphorus oxide having an olivine structure, and a combination thereof.

5. The method of claim 1, wherein the drying is carried out at a temperature of about 100° C. to about 200° C. under a vacuum or inert gas atmosphere.

6. The method of claim 2, wherein the composite powder comprises a positive electrode active material, a solid electrolyte, and a conductive material at a mass ratio of 65 to 80:10 to 25:10 to 20.

7. The method of claim 1, wherein the hot-pressing is carried out at a temperature of about 100° C. to about 200° C. for about 5 minutes to about 60 minutes.

8. The method of claim 1, wherein the hot-pressing is carried out under a pressure of about 1 ton to about 10 tons.

9. A method for preparing a positive electrode-electrolyte layer composite for an all-solid state battery, the method comprising:

applying the composite powder of claim 1 in a mold;

applying an electrolyte powder onto the composite powder; and hot-pressing the composite powder and the electrolyte powder.

10. The method of claim 9, wherein the electrolyte powder is selected from the group consisting of an oxide-based solid electrolyte powder, a sulfide-based solid electrolyte powder, and a combination thereof.

\* \* \* \* \*